United States Patent
Ikegaya et al.

(10) Patent No.: US 6,308,123 B1
(45) Date of Patent: Oct. 23, 2001

(54) VEHICLE STEERING CONTROL SYSTEM

(75) Inventors: Manabu Ikegaya; Shinnosuke Ishida; Satoshi Kondo; Jun Tanaka, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/599,606

(22) Filed: Jun. 23, 2000

(30) Foreign Application Priority Data

Jun. 25, 1999 (JP) .................................................. 11-180069

(51) Int. Cl.$^7$ ........................................................ B62D 5/04
(52) U.S. Cl. ............................ 701/41; 180/422; 180/446
(58) Field of Search ................................... 701/41, 42, 43; 180/410, 412, 415, 422, 443, 446

(56) References Cited

U.S. PATENT DOCUMENTS

| | | | |
|---|---|---|---|
| 5,481,457 | * | 1/1996 | Yamamoto et al. ................... 701/41 |
| 5,765,116 | * | 6/1998 | Wilson-Jones et al. ............... 701/41 |
| 6,050,359 | * | 4/2000 | Mouri et al. ......................... 180/415 |
| 6,053,270 | * | 4/2000 | Nishikawa et al. .................... 701/41 |
| 6,134,491 | * | 10/2000 | Kawagoe et al. ...................... 701/43 |
| 6,212,453 | * | 4/2001 | Kawagoe et al. ...................... 701/41 |

FOREIGN PATENT DOCUMENTS 5-197423   8/1993   (JP) .

* cited by examiner

*Primary Examiner*—Gary Chin
(74) *Attorney, Agent, or Firm*—Arent Fox Kintner Plotkin & Kahn, PLLC

(57) ABSTRACT

A vehicle steering control system for conducting a steering assistance control in which a basic steering assist torque is determined based on a structural parameter relating to the lane structure such as its curvature. In parallel, corrective steering assist torques are determined based on positional parameters of the vehicle relating to the lane such as a lateral deviation from the lane center line and a vehicle heading angle, and are added to the basic steering assist torque to correct the same. Since the positional parameters are determined based on the image information at or close to the vehicle, this enables to determine the steering assist torque adequately, thereby enhancing the accuracy of the steering assistance control.

5 Claims, 4 Drawing Sheets

VEHICLE STEERING CONTROL SYSTEM

BACKGROUND OF THE INVENTION

1. Field of the Invention

This invention relates to a vehicle steering control system.

2. Description of the Related Art

Various technologies have recently been proposed for using a CCD (Charge-Coupled Device) camera or the like mounted on a vehicle, which takes an image of the surface of an expressway or any other road on which the vehicle is traveling and detects white lines (lines painted on the road and defining a lane boundary) from the obtained image and based on this, controlling steering assist torque of the vehicle such that the vehicle runs along the lane. In this kind of steering assistance control, the system determines an error (deviation) between a desired position set on a noticed point on the lane ahead of the vehicle and a point to which the vehicle is predicted to reach, calculates information relating to the structure of the lane such as its curvature, and based thereon, determines the required steering assist torque.

In order to determine the point to which the vehicle is predicted to reach, two methods are widely used, the so-called "first prediction method" and the "second prediction method". In the first prediction method, the point is calculated based on the vehicle heading angle at a current vehicle position on the lane from the lane information obtained from the image. In the second prediction method, the point is calculated based on the yaw rate (angular velocity of yaw) around the vertical axis (the axis of gravity) detected by a yaw rate sensor mounted on the vehicle. The assignee proposed the latter in Japanese Laid-Open Patent Application No. Hei 5 (1993)-197423.

However, as regards the first prediction method, since this uses the lane information obtained from the image, an accidental error grows with increasing distance, in other words, an accidental error grows as the point is set at a distance farther from the vehicle. In addition, the accidental error also grows due to a change of posture of the vehicle (on which the camera is mounted), such as pitching or rolling, bumps or undulations of the lane, etc.

As a result, when conducting a feedback control such that the error (deviation) between the predicted point (after a predicted period of time) and a desired position obtained from the image decreased, it is greatly affected by the accidental error involved in the image. This sometimes makes the steering assist torque to be calculated inadequately, thereby degrading the accuracy of the steering assistance control.

As regards the second prediction method, the yaw rate is usually detected using a yaw rate sensor mounted on the vehicle. However, since the output of the yaw rate sensor involves accidental errors due to offset or drift, the predicted point determined from the yaw rate sensor output is not free from accidental errors, thereby rendering similar problems to occur.

SUMMARY OF THE INVENTION

An object of this invention is therefore to solve the aforesaid problem by providing a vehicle steering control system for conducting a steering assistance control such that the vehicle runs along a lane, which enables to determine the steering assist torque adequately, thereby enhancing the accuracy of the steering assistance control.

In order to achieve this object, there is provided a system for controlling steering of a vehicle having an actuator which turns steered wheels of the vehicle; comprising: an image sensor mounted on the vehicle for taking an image ahead of the vehicle; lane detecting means for detecting a lane on which the vehicle travels based on image information obtained from outputs of the image sensor; basic steering assist torque determining means for determining a structural parameter relating to a structure of the detected lane and for determining a basic steering assist torque based on the determined structural parameter in accordance with a predetermined characteristic; corrective steering assist torque determining means for determining a positional parameter of the vehicle relating to the lane and for calculating a corrective steering assist torque based on the determined positional parameter; actuator manipulated variable determining means for determining a manipulated variable to be supplied to the actuator based on the determined basic steering assist torque and the corrective steering assist torque such that the vehicle runs along the lane; and an actuator driver for driving the actuator based on the determined manipulated variable.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
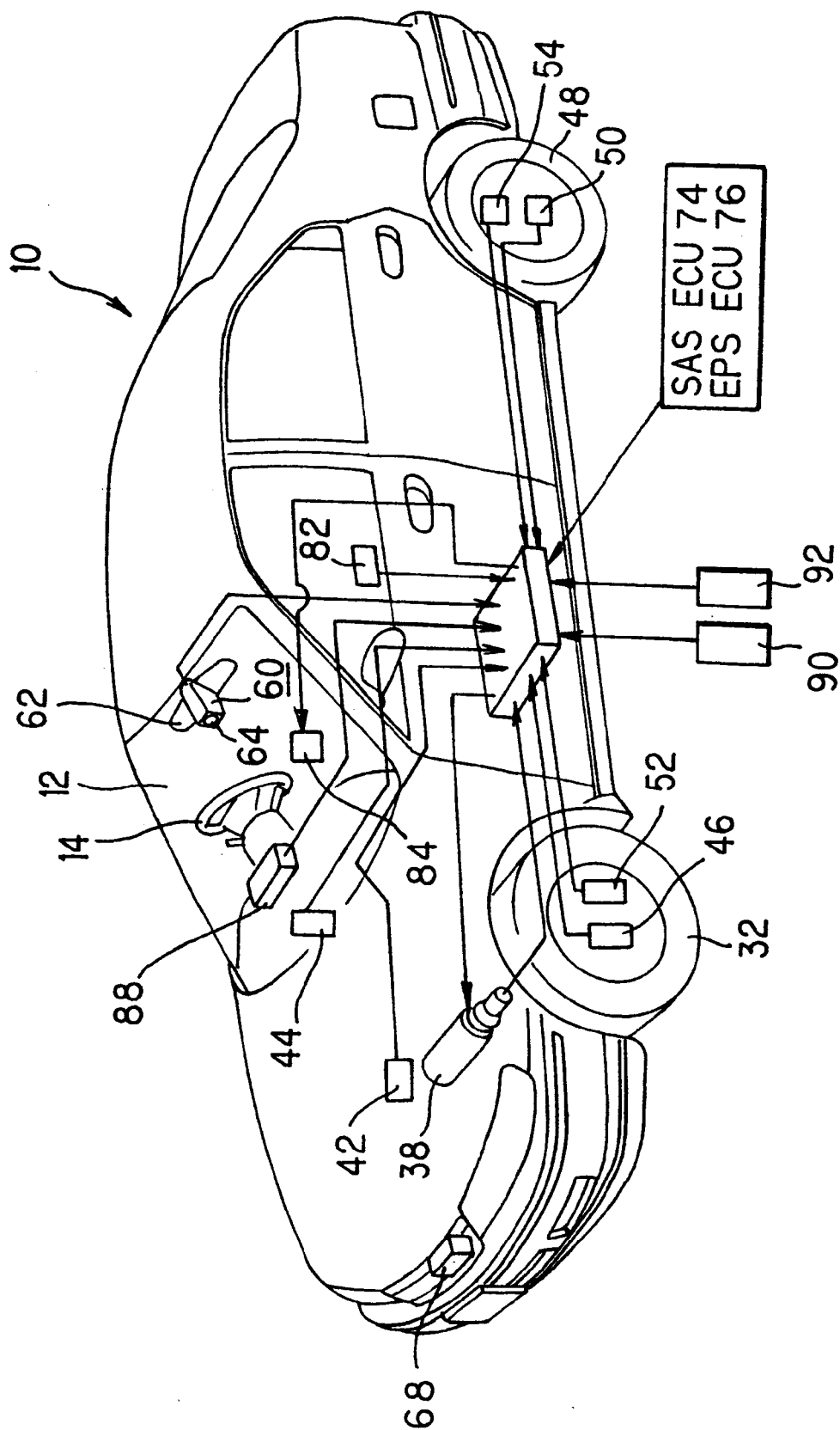
FIG. 1 is a view showing the overall configuration of a vehicle steering control system according to the present invention.
Figure 2:
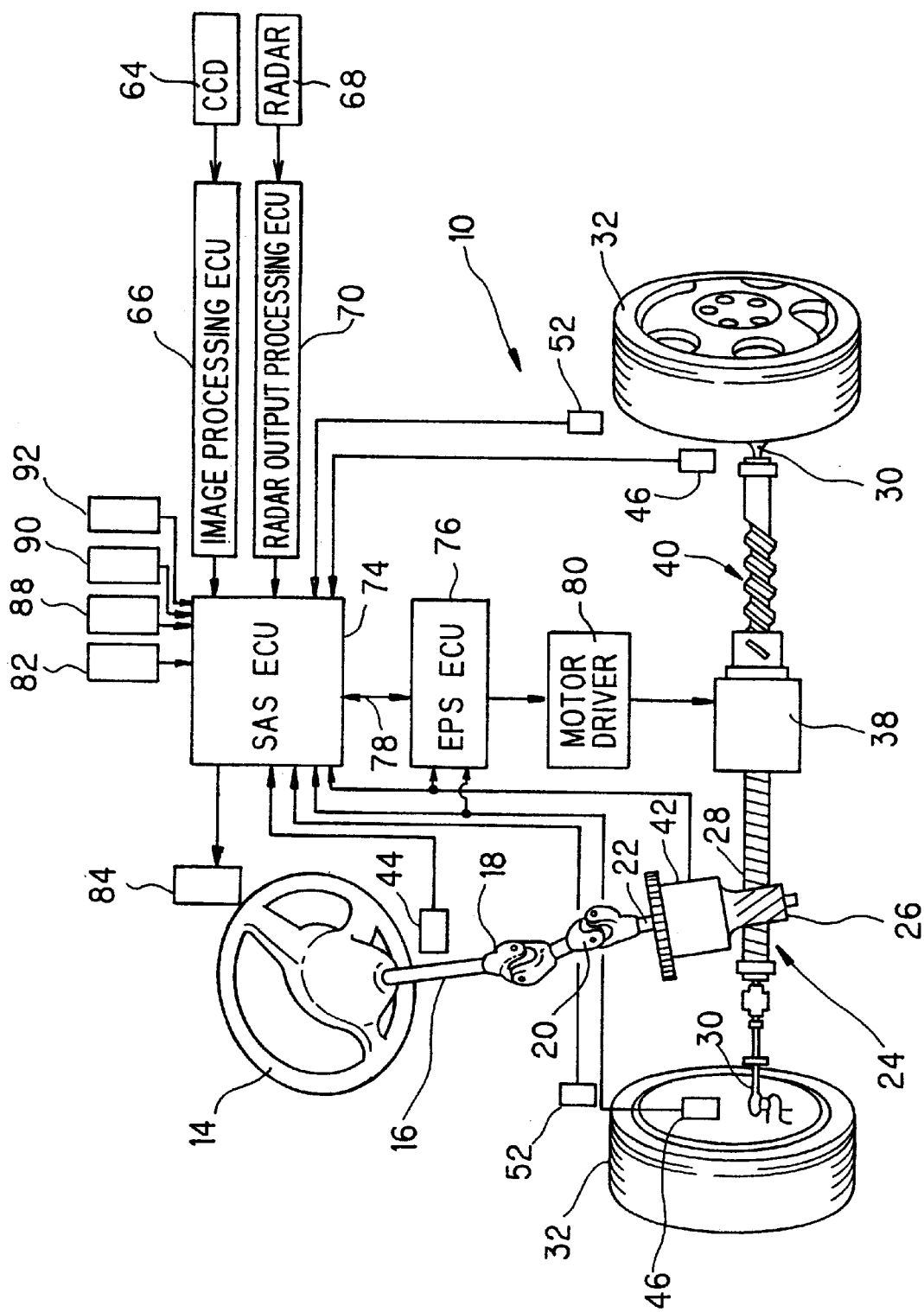
FIG. 2 is an explanatory view showing the configuration of a steering assistance mechanism illustrated in FIG. 1.

FIG. 1 is a view schematically showing a vehicle steering control system according to the present invention. FIG. 2 is an explanatory view of the system with particular focus on the steering assistance mechanism.

As shown in FIGS. 1 and 2, a steering wheel 14 located close to the vehicle operator's seat (not clearly shown in the figure) 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion inputted from the steering wheel 14 by the vehicle operator passes through the pinion 26 to be converted into linear motion of the rack 28. The linear motion passes through tie rods (steering rods) 30, 30 at opposite ends of the front axle to turn two front wheels (steered wheels) 32, 32 in a desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) inputted through the steering wheel 14 by the vehicle operator.

A torque sensor 42 is provided in the vicinity of the rack-and-pinion steering gear 24 and outputs a signal indicating the direction and magnitude of the steering force (steering torque) τh inputted by the vehicle operator. A steering angle sensor 44 is provided in the vicinity of the steering shaft 16 and outputs a signal indicating the direction and magnitude of the steering angle (more precisely the angle of the steered front wheels 32) inputted by the vehicle operator. The steering angle sensor 44 is a rotary encoder or the like.

Wheel speed sensors 46, 46 situated in the vicinity of each of the front wheels 32, 32 and wheel speed sensors 50, 50 (FIG. 1; only one shown) situated in the vicinity of each of the two rear wheels 48, 48 (only one shown), output signals once every predetermined angle of rotation of the associated front and rear wheels. The wheel speed sensors 46, 46 and 50, 50 are magnetic pickups or the like. The front wheels 32, 32 are driven (steered) wheels powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single monocular CCD (Charge-Coupled Device) camera 64 (image sensor) combined with a rear-view mirror 62 is attached to the inner surface of the windshield 60 above the vehicle operator's seat 12. The CCD camera 64 is installed to take an image ahead of the vehicle 10, more particularly, to photo-sense and output an image signal of the road ahead of the vehicle 10. As shown in FIG. 2, the image signal outputted by the CCD camera 64 is forwarded to an image processing ECU (Electronic Control Unit) 66, comprised of a microcomputer, that extracts the lane boundaries (white lines) painted on the road from the image signal.

A laser radar (in a unit) 68 is provided at appropriate locations near the front bumper of the vehicle 10 and emits a laser beam forward in the direction in which the vehicle 10 advances, and scans to the left and right direction (vehicle-width direction). The outputs of the laser radar 68 are forwarded to a radar output processing ECU 70, also comprised of a microcomputer, where they are mixed with received waves obtained through an antenna (not shown) when the beam is reflected by a rigid object such as a reflector of another vehicle present ahead to calculate (detect) the distance to the rigid object based on the time lag from the beam transmission and the wave reception and the direction of the object based on the direction of beam transmission to which the reflection is received.

The vehicle steering control system according to the present invention has a first Electronic Control Unit (shown as "SAS ECU") 74, also comprised of a microcomputer. The outputs of the image processing ECU 66, the radar output processing ECU 70 and the torque sensor 42 etc., are inputted into the SAS ECU 74.

The system is also equipped with a second Electronic Control Unit (shown as "EPS ECU") 76 also comprised of a microcomputer. The outputs of the torque sensor 42 and the wheel speed sensor 46, etc., are inputted into the EPS ECU 76.

The SAS ECU 74 and the EPS ECU 76 are connected with a signal line 78 and can communicate with each other. The SAS ECU 74 calculates the lane-keeping-steering assist torque (output steering assist torque) TL such that the vehicle 10 runs along the lane, as explained later and forwards the same to the EPS ECU 76. The EPS ECU 76 calculates the power-steering assist torque such that the vehicle operator's steering is assisted if the steering τh is detected and corrects the received lane-keeping-steering assist torque TL by the calculated power-steering assist torque. Then, based on the output steering assist torque TL (corrected or not corrected), it calculates or determines a manipulated variable (motor current duty ratio) to be supplied to the electric motor 38.

The EPS ECU 76 is connected to a motor driver 80. The motor driver 80 is equipped with a known bridge circuit (not shown) composed of four power FET switching devices, the on/off state of which determines the direction in which the electric motor 38 will turn. The EPS ECU 76 calculates or determines the motor current in duty ratio in terms of PWM (pulse-width modulation) and outputs it to the motor driver 80. Thus, the EPS ECU 76 duty-ratio controls the FET switching devices to regulate the motor current such that the electric motor 38 generates the required assist torque.

A yaw rate sensor 82 is installed at a location near the center of gravity of the vehicle 10. The yaw rate sensor 82 outputs a signal indicating the yaw rate (angular velocity of yaw) around the vertical axis (the axis of gravity) at the center of gravity of the vehicle 10.

An alarm 84 is provided in the vicinity of the dashboard near the vehicle operator's seat 12 and alerts the vehicle operator audibly or visionally. Moreover, this system is equipped with a navigation system 88 (omitted in FIG. 1).

A brake switch 90 is associated with a brake pedal (not shown) near the floor at the vehicle operator's seat 12 and outputs a signal indicating the depression of the brake pedal by the vehicle operator. An accelerator position sensor 92 is associated with an accelerator pedal (not shown) and outputs a signal indicating the amount of depression of the accelerator pedal by the vehicle operator.

Figure 3:
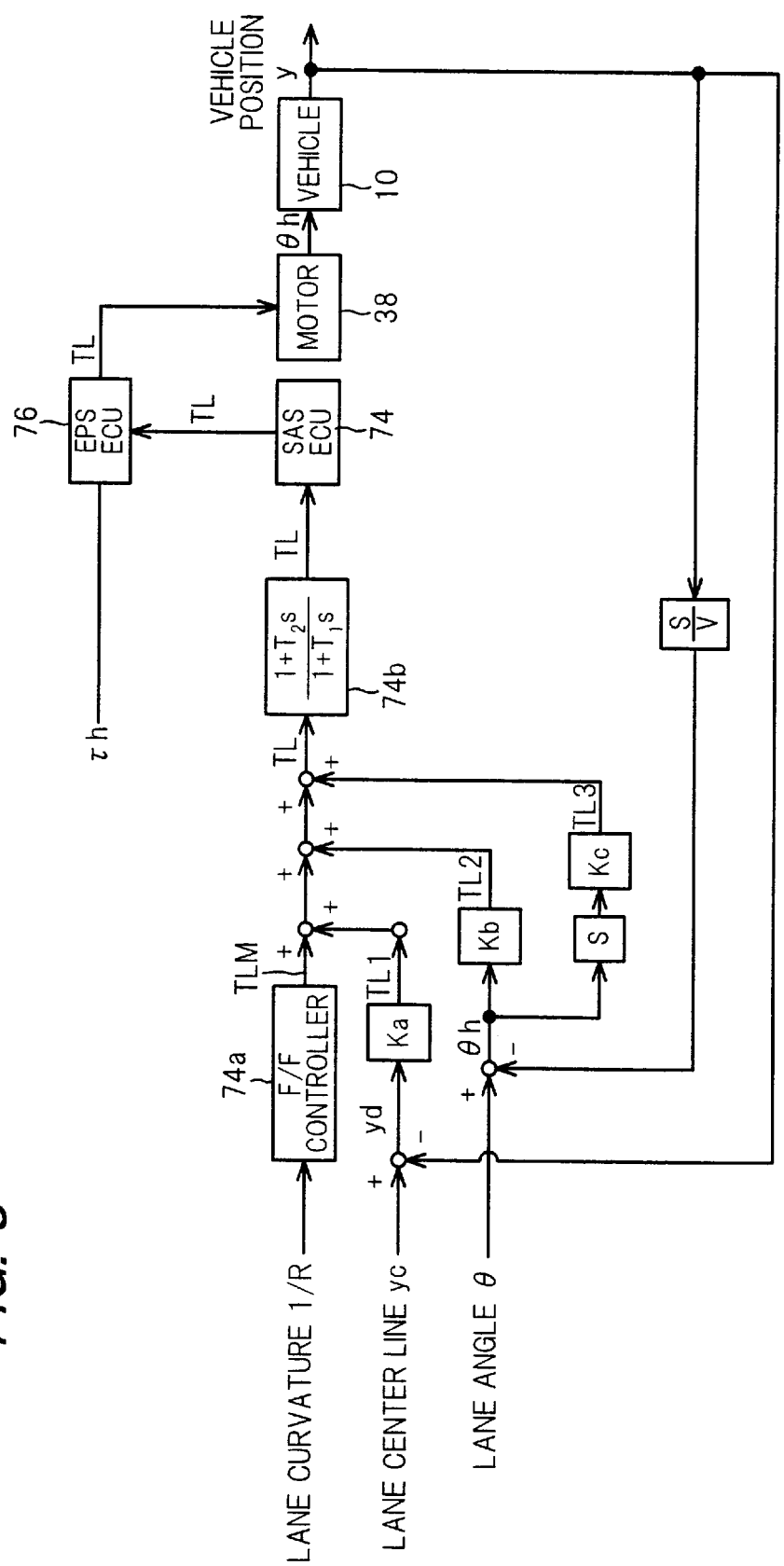
FIG. 3 is a block diagram showing the operation of the system illustrated in FIGS. 1 and 2.

FIG. 3 is a block diagram showing the operation of the vehicle steering control system according to the embodiment of the invention. The control illustrated there is conducted by the SAS ECU 74 and the EPS ECU 76, more precisely, mainly by the SAS ECU 74.

Specifically, the lane curvature (a structural parameter relating to the structure of the lane) 1/R is first determined or calculated based on the lane boundaries (white lines) obtained by image processing the output of the CCD camera 64 in the image processing ECU 66. Explaining this with reference to FIG. 4 which shows the image data obtained at the image processing ECU 66, the turning radius R of the center (reference) line yc of a lane is, geometrically calculated and the curvature 1/R is determined by calculating the reciprocal number of the turning radius R.

At the same time, based on the image data obtained at the image processing ECU 66, the position y of the vehicle 10 on the lane is detected, and positional parameters relating to the position of the vehicle 10 relative to the lane (i.e. a lateral deviation yd and a heading angle θh of the vehicle 10 relative to the lane) are calculated.

Figure 4:
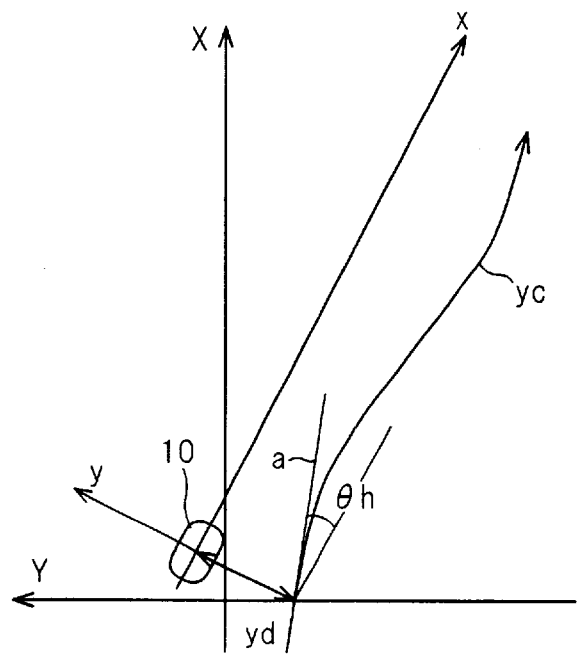
FIG. 4 is an explanatory graph showing the calculation of parameters to be used in the steering assistance control illustrated in FIG. 3.

More specifically, these positional parameters are calculated based on the memory of the image processing ECU 66 comprising lane information made of the image signals of the CCD camera 64 in the absolute coordinate system and the position information of the vehicle 10 overlapped thereon, as shown in FIG. 4. In FIG. 4, X-Y coordinates indicate the absolute coordinate system. And, x-y coordinates indicate a relative coordinate system whose origin is set at the vehicle 10, whose x-axis is set to the direction in which the vehicle 10 advances and whose y-axis is set to the direction perpendicular thereto.

In the relative coordinate system, the vehicle lateral deviation yd indicates the distance in the vehicle-width direction between the point (at which the lane center line yc and the y-axis intersect) and the vehicle 10. The vehicle heading angle θh indicates the angle made by the tangent a at the point (closest to the vehicle 10) on the lane center line yc and the x-axis. The angle made by the tangent a relative to the Y-axis of the absolute coordinate system is called lane angle θ (which is shown in FIG. 4).

As will be understood from the above, these positional parameters, i.e. the lateral deviation yd and the vehicle heading angle θh are values at or close to the place where the vehicle 10 is currently situated. In other words, they are not values defined at a position far from the vehicle 10 (as is used in the prior art). The same will also be applied to the other structural parameter of the lane curvature 1/R.

The block diagram of FIG. 3 shows that the vehicle lateral deviation yd is calculated as an error or deviation between the detected value (vehicle position y) and a desired value (the lane center line yc), and the vehicle heading angle θh is similarly calculated as an error or deviation between a detected value (obtained by dividing the differential (shown by a Laplacian S) of the vehicle position y by the detected vehicle speed V; i.e. a value corresponding to the angle) and a desired value (lane angle θ).

In practice, however, the vehicle lateral deviation yd and the vehicle heading angle θh are calculated geometrically from the image information in a manner similar to the calculation of the structural parameter of the lane curvature 1/R, as will be understood from FIG. 4. Therefore, the calculation illustrated in FIG. 3 is for the purpose of understanding.

Returning to the explanation of FIG. 3, the calculated lane curvature 1/R is inputted into a F/F (feedforward) controller 74a (indicating one function of the SAS ECU 74), where a basic steering assist torque TLM is determined or calculated based on the inputted lane curvature 1/R in accordance with a predetermined characteristic. Parallel to this, first to third corrective steering assist torques TLn (n: 1 to 3) are calculated based on the calculated vehicle lateral deviation yd and the vehicle heading angle θh and are added to the basic steering assist torque TLM at adders.

Specifically, the first corrective steering assist torque TL1 is determined or calculated by multiplying the calculated vehicle lateral deviation yd by a first gain (feedback correction coefficient) Ka. The second corrective steering assist torque TL2 is determined or calculated by multiplying the vehicle heading angle θh by a second gain (feedback correction coefficient) Kb. And the third corrective steering assist torque TL3 is determined or calculated by multiplying the differential of the vehicle heading angle θh by a third gain (feedback correction coefficient) Kc.

In the above, the basic steering assist torque TLM indicates an assist torque which balances with the cornering force of the vehicle 10. The first and second corrective steering assist torques are assist torques which cause the vehicle 10 to run along the lane center line yc and ensure the stability of the vehicle 10. The third corrective steering assist torque is an assist torque which enhances the stability of the torque assistance control.

The corrective steering assist torques TLN are added to the basic steering assist torque TLM to determine or calculate the output steering assist torque TL and based on which, the steering of the vehicle 10 is assisted such that the vehicle 10 runs along the lane, more precisely, runs along the lane center line yc. The output steering assist torque TL is inputted into a phase compensator 74b (similarly indicating one function of the SAS ECU 74), where it is subjected to the phase compensation (i.e. phase lead-lag compensation) and inputted, via SAS ECU 74, into the EPS ECU 76.

As mentioned above, the EPS ECU 76 calculates the power-steering assist torque if the steering torque τh is detected and corrects the output steering assist torque (lane-keeping-steering assist torque) TL by the calculated power-steering assist torque and based on the output steering assist torque TL (corrected or not corrected), calculates or determines a manipulated variable (motor current duty ratio) to be supplied to the electric motor 38 to turn the steered front wheels 32.

Figure 5:
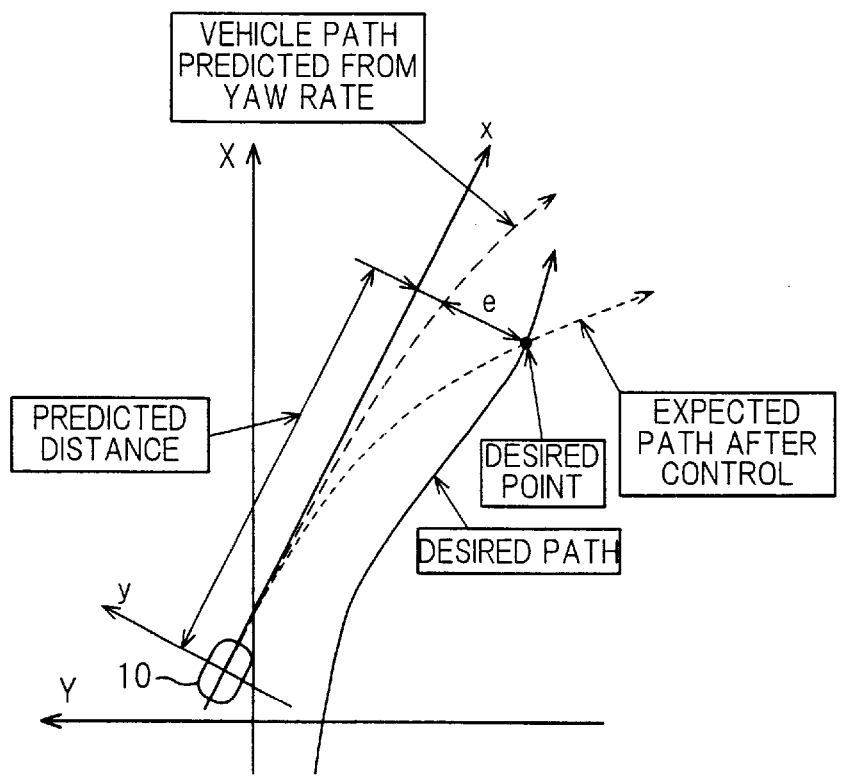
FIG. 5 is a view, similar to FIG. 4, but showing the calculation of parameters to be used in the steering assistance control in the prior art.

FIG. 5 is an explanatory graph showing the calculation of parameters to be used in the steering assistance control in the prior art, more specifically, the geometric relationship of the error e for determining the manipulated variable obtained using the second prediction method.

In the second prediction method, the error e between a desired point (far from the vehicle 10) set on the lane center line and the point (to which the vehicle 10 is predicted to reach; obtained based on the detected yaw rate) is determined and based on the error, the steering assist torque is determined. However, since the error is determined as a deviation in the positions set at a distance far from the vehicle 10, accidental error is apt to enter the determination, as mentioned above. Moreover, another accidental error inherent to the yaw rate sensor 82 will be added. With this, in the prior art steering assistance control, it is sometimes difficult to determine the steering assist torque adequately.

In the system according to this embodiment, on the other hand, although the image information is still used, the image information used here is not that for the position set at a distance far from the vehicle 10, but is that for the position set at or close to the vehicle 10, in other words, the image information with high detection accuracy is used. With this, the system according to the embodiment can decrease an accidental error from entering the steering assist torque determination.

Moreover, since a noticed point in the lane ahead of the vehicle 10 is no longer used, it becomes unnecessary to calculate the point (to which the vehicle 10 is predicted to reach) using the yaw rate sensor output. Since the output of the yaw rate sensor is no longer used, the determination of the steering assist torque in this embodiment is not affected by the accidental error inherent to the yaw rate sensor. This further enables to determine the steering assist torque adequately and to enhance the accuracy of the steering assistance control.

The embodiment is thus configured to have a system for controlling steering of a vehicle (10) having an actuator (electric motor 38) which turns steered wheels (32) of the vehicle; comprising: an image sensor (CCD camera 64) mounted on the vehicle for taking an image ahead of the vehicle; lane detecting means (image processing ECU 66) for detecting a lane on which the vehicle travels based on image information obtained from outputs of the image sensor; basic steering assist torque determining means (SAS ECU 74, F/F controller 74a) for determining a structural parameter relating to a structure of the detected lane (lane curvature 1/R) and for determining a basic steering assist torque (TLM) based on the determined structural parameter in accordance with a predetermined characteristic; corrective steering assist torque determining means (SAS ECU 74) for determining a positional parameter of the vehicle relating to the lane (lateral deviation yd and vehicle heading angle θh) and for calculating a corrective steering assist torque (TLn) based on the determined positional parameter; actuator manipulated variable determining means (EPS ECU 76) for determining a manipulated variable (motor current duty ratio) to be supplied to the actuator based on the determined basic steering assist torque and the corrective steering assist torque such that the vehicle runs along the lane; and an actuator driver (motor driver 80) for driving the actuator based on the determined manipulated variable.

In the system, the corrective steering assist torque determining means includes: vehicle position determining means for determining a position (y) of the vehicle (10) on the lane based on the image information; error determining means for determining an error (lateral deviation yd, vehicle heading angle θh) between the detected position of the vehicle and a desired value (lane (reference) center line yc, lane angle θ) as the positional parameter; and corrective steering assist torque calculating means for calculating the corrective steering assist torque by multiplying the determined error by a feedback correction coefficient (Ka, Kb, Kc).

In the system, the positional parameter is at least one of a lateral deviation (yd) of the vehicle in a vehicle-width direction from a reference line (yc) of the lane and a heading angle (θh) of the vehicle relative to the lane.

In the system, the corrective steering assist torque determining means includes: vehicle position determining means for determining a position of the vehicle on the lane based on the image information; vehicle heading angle calculating means for calculating a heading angle of the vehicle relative to the lane based on the detected position of the vehicle as the positional parameter; and corrective steering assist torque calculating means for calculating the corrective steering assist torque by multiplying the calculated heading angle of the vehicle by a feedback correction coefficient.

In the system, the corrective steering assist torque determining means includes: heading angle differential calculating means for calculating a differential (S) of the calculated heading angle (θh) of the vehicle; and corrective steering assist torque calculating means for calculating the corrective steering assist torque by multiplying the calculated differential of the heading angle of the vehicle by a feedback correction coefficient (Kc).

It should be noted in the above that, although the lane curvature 1/R is used as the structural parameter relating to the structure of the lane, the turning radius R may instead be used. The lateral deviation yd and the vehicle heading angle θh are examples of the positional parameters.

It should also be noted in the above that, although the lateral deviation is calculated as the distance from the lane center line yc, it is alternatively possible to calculate it as a given point such as the lane boundary line (white line).

It should further be noted in the above that, although the basic steering assist torque TLM and the corrective steering assist torques Tln are added together to determine the output steering assist torque TL, it is alternatively possible to calculate factors corresponding to the corrective steering assist torque Tln and multiply the basic steering assist torque TLM by the factors to determine the output steering torque TL.

It should further be noted in the above that, although the power-steering assist torque is calculated by the EPS ECU 76, this may instead be conducted by the SAS ECU 74.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of a vehicle having an actuator which turns steered wheels of the vehicle; comprising:

an image sensor mounted on the vehicle for taking an image ahead of the vehicle;

lane detecting means for detecting a lane on which the vehicle travels based on image information obtained from outputs of the image sensor;

basic steering assist torque determining means for determining a structural parameter relating to a structure of the detected lane and for determining a basic steering assist torque based on the determined structural parameter in accordance with a predetermined characteristic;

corrective steering assist torque determining means for determining a positional parameter of the vehicle relating to the lane and for calculating a corrective steering assist torque based on the determined positional parameter;

actuator manipulated variable determining means for determining a manipulated variable to be supplied to the actuator based on the determined basic steering assist torque and the corrective steering assist torque such that the vehicle runs along the lane; and an actuator driver for driving the actuator based on the determined manipulated variable.

2. A system according to claim 1, wherein the corrective steering assist torque determining means includes:

vehicle position determining means for determining a position of the vehicle on the lane based on the image information;

error determining means for determining an error between the detected position of the vehicle and a desired value as the positional parameter; and corrective steering assist torque calculating means for calculating the corrective steering assist torque by multiplying the determined error by a feedback correction coefficient.

3. A system according to claim 1, wherein the positional parameter is at least one of a lateral deviation of the vehicle in a vehicle-width direction from a reference line of the lane and a heading angle of the vehicle relative to the lane.

4. A system according to claim 1, wherein the corrective steering assist torque determining means includes:

vehicle position determining means for determining a position of the vehicle on the lane based on the image information;

vehicle heading angle calculating means for calculating a heading angle of the vehicle relative to the lane based on the detected position of the vehicle as the positional parameter; and corrective steering assist torque calculating means for calculating the corrective steering assist torque by multiplying the calculated heading angle of the vehicle by a feedback correction coefficient.

5. A system according to claim 4, wherein the corrective steering assist torque determining means includes:

heading angle differential calculating means for calculating a differential of the calculated heading angle of the vehicle; and corrective steering assist torque calculating means for calculating the corrective steering assist torque by multiplying the calculated differential of the heading angle of the vehicle by a feedback correction coefficient.

* * * * *

UNITED STATES PATENT AND TRADEMARK OFFICE
CERTIFICATE OF CORRECTION

PATENT NO. : 6,308,123 B1
DATED : October 23, 2001
INVENTOR(S) : Ikegaya et al.

Page 1 of 1

It is certified that error appears in the above-identified patent and that said Letters Patent is hereby corrected as shown below:

<u>Claim 5,</u>
Line 6, insert -- said -- before the word "corrective".
Lines 6-7, delete the phrase "for calculating" and insert -- calculates -- in place thereof.
Line 9, delete the word "a" and insert -- said -- in place thereof.

Signed and Sealed this

Second Day of April, 2002

*Attest:*

JAMES E. ROGAN
*Attesting Officer*  *Director of the United States Patent and Trademark Office*